United States Patent [19]
Watanabe et al.

[11] Patent Number: 6,104,409
[45] Date of Patent: Aug. 15, 2000

[54] THREE-DIMENSIONAL OBJECT DATA PROCESSING METHOD AND SYSTEM

[75] Inventors: Kenshiu Watanabe, Hitachiota; Yutaka Kanou, Fujisawa, both of Japan

[73] Assignee: Japan Nuclear Cycle Development Institute, Tokyo, Japan

[21] Appl. No.: 09/060,300

[22] Filed: Apr. 15, 1998

[30] Foreign Application Priority Data

Apr. 21, 1997 [JP] Japan .................................. 9-103191

[51] Int. Cl.⁷ .................................................. G06F 15/00
[52] U.S. Cl. ........................................................... 345/430
[58] Field of Search .................................. 345/425, 428, 345/429, 430, 431, 432

[56] References Cited

U.S. PATENT DOCUMENTS 5,592,599  1/1997  Lindholm ................................ 395/127

FOREIGN PATENT DOCUMENTS

| 0 436 790 A2 | 7/1991 | European Pat. Off. . |
| 195 49 096 A1 | 9/1996 | Germany . |
| 1-214979 | 8/1989 | Japan . |
| 6-348860 | 12/1994 | Japan . |
| 2 284 526 | 6/1995 | United Kingdom . |

WO 96/27169 A1  9/1996  WIPO .

OTHER PUBLICATIONS

J. L. Bentley, "Multidimensional Binary Search Trees Used For Associative Searching", Communications of the ACM, vol. 18, No. 9, 509–517 (1975).

J. B. Rosenberg, "Geographical Data Structures Compared: A Study of Data Structures Supporting Region Queries", IEEE Trans. On CAD, vol. CAD–4, No. 1, 53–67, (1985).

Tamada, Takashi et al., "Rapid Rendering and Management Techniques for the 3D–Virtual Building Environments Using Multidimensional Data Structures," The Transaction of the Institute of Electronics, Information and Communication Engineers D–II, vol. J78–D–II, No. 8, Aug. 1995, pp. 1205–1213.

*Primary Examiner*—Phu K. Nguyen
*Attorney, Agent, or Firm*—Oliff & Berridge, PLC

[57] ABSTRACT

A three-dimensional object data processing method and system reduces the number of coordinate calculations of the objects when an eyepoint changes during CG processing. A workstation (2) comprises a space searching module (6) which searches for the objects included in a view volume, a rasterizing module (12) which displays the view volume, and a texture data generating module (10) which groups a plurality of objects according to a user's request and generates two-dimensional texture data. Each object is drawn as texture data.

20 Claims, 14 Drawing Sheets

THREE-DIMENSIONAL OBJECT DATA PROCESSING METHOD AND SYSTEM

BACKGROUND OF THE INVENTION

1. Field of the Invention

This invention relates to a method of processing three-dimensional object data, and more particularly to a method of searching for and reading out data of objects contained in a space for processing relevant to rendering from a storage unit, when three-dimensional data for such objects is previously stored in the storage unit.

2. Description of the Related Art

In the world of three dimensional computer graphics (CG), three dimensional objects are often rendered according to the user's eyepoint. For example, when rendering an image of buildings from above, a user must first specify parameters designating user's eyepoint and line-of-sight. These parameters determine a visual space called a view volume. Next, three-dimensional data on the buildings and other objects is read out from a storage for viewing transformation in which coordinates are transformed, followed by a clipping operation in which objects outside the view volume are removed. Rasterizing (rendering) processing is performed on the objects not removed by clipping and colors are applied on them. The objects are then displayed on the screen.

Some CG applications, such as a driving simulation or a walk-through simulation in which images are constantly changing according to the user's eyepoint, require that the coordinates of all the objects be re-calculated each time the eyepoint changes. This makes it impossible for real-time processing to be done smoothly when the number of objects is large. Although computers are becoming more and more powerful, there is a tendency for the speed required by CG applications to exceed the speed of the computer, making computer processing speed a major bottleneck in three-dimensional CG processing. In particular, when, for example, a driving simulation must cover all the objects in a town or when a walk-through video of a factory with various facilities is created, a huge number of objects is involved. Three-dimensional real-time data simulation cannot be done using a conventional method when the amount of data is this large.

SUMMARY OF THE INVENTION

The present invention seeks to solve the problems described above. It is an object of this invention to provide a three-dimensional object data processing system capable of rendering objects quickly, even when they are great in number.

The three-dimensional object data processing method according to the present invention may comprise a step of storing at least one piece of three-dimensional object data into a storage unit; a first extraction step of extracting objects stored in the storage unit and included in a space relevant to rendering; and a step of grouping the extracted objects into a group, associating the objects with the group and projecting the grouped object data onto an eyepoint dependent plane to generate two-dimensional texture data representing the group, and associating the texture data with the group. An "integration box", which will be described later, is an example of a "space including objects to be rendered." An "eyepoint dependent plane" is a plane which is near an object and which is vertical to the line of sight when the object is viewed from the eyepoint. "Parallel projection" is one type of projection. "Texture data", which represents patterns, refers to data from which two-dimensional images such as two-dimensional data consisting of picture elements is generated. In the present invention, a plurality of objects projected on the plane are treated as "patterns" on that plane. The method according to the present invention uses the projection of three-dimensional data to generate texture data, making it possible to generate texture data only from the existing three-dimensional data. This means that existing three-dimensional data may be fully utilized.

The method or system of this configuration holds a plurality of objects in the form of two-dimensional texture data, eliminating the need for the transformation of three-dimensional data, even when the eyepoint position changes. A reduced calculation load further increases real-time processing ability. In addition, the present invention, capable of generating two-dimensional data even for non-flat objects, is widely applicable.

In one aspect of the present invention, when a group is drawn, the texture data on the group may be displayed on the far side of the space to be rendered. This configuration prevents an object newly appearing in the space from being hidden by the texture data.

According to another aspect of the present invention, data of a plurality of textures may be stored for a group so that a desired texture may be selected for rendering the group according to its distance from the eyepoint. Conventionally, the concept of LOD (Level Of Detail) has been used in CG. This concept is that a plurality of models of object image data are prepared according to the level of detail and that a lower detail level model is used for an object that is far from the eyepoint. The present invention applies LOD to a group composed of a plurality of objects. A group close to the eyepoint to is rendered clearly, while a group far from the eyepoint less clearly. The present invention performs LOD processing on a group basis which is much faster than LOD processing on an object basis.

A method or a system according to the present invention uses a tree, such as a k-d tree (k-dimensional tree), in the object search with coordinate values as keys. Each node of this tree may contain group data allowing the tree to be used in group management as well as searching. When searching a tree of this configuration for an object, a check is made to see which object belongs to which group. This ability enables group processing to be performed instead of individual object processing, increasing the usefulness of the present invention, which uses grouping.

A three-dimensional object data processing method according to the present invention groups a plurality of objects in terms of a spatial relation and converts the object image data of the group to texture data for storage. The spatial relation refers to a positional relation which does not include a logical positional relation. The logical positional relation is a hierarchical positional relation that may be structured logically; for example, "eyes" are hierarchically lower than "face" because "eyes" are included in "face". The technique for structuring objects hierarchically is a known technique. The present invention groups objects in terms of the spatial, rather than logical, relation. For example, a plurality of objects approximately equal in distance from the eyepoint and placed closely are grouped. This method groups a plurality of closely-placed objects into one, making a single copy of texture data to be used for many types of rendering, such as rendering of a walk-through image.

A system according to the present invention may comprise first storage means for storing at least one piece of three-dimensional object data; means for determining a space including objects to be drawn; first extraction means for extracting objects stored in the first storage means and included in the space including objects to be rendered; and texture data generating means for grouping the objects extracted by the first extraction means into a group, for associating the objects with the group, and for projecting grouped object data onto an eyepoint dependent plane to generate two-dimensional texture data representing the group; and second storage means for associating the texture data generated by the texture data generating means with the group.

DESCRIPTION OF THE PREFERRED EMBODIMENT

A three-dimensional object data processing method, a preferred embodiment of the present invention, is described using a space search system which takes advantage of the method.

[1] 6-d tree

The embodiment of the present invention manages coordinate data of three-dimensional object using a 6-d tree (6-dimensional tree). A 6-d tree is a k-d (k dimensional) tree where the number of keys (k) is 6. A k-d tree is a binary tree used in a binary search where the number of search keys is k. This embodiment extends the technique for using a k-d tree in searching for objects in the two-dimensional area so that the technique may be used in searching for objects in a three-dimensional area. The following explains the concept of trees in order of a 1-d tree, a 2-d tree, and a 6-d tree. Techniques for using a k-d tree for a plane search are described in "Multidimensional binary search trees used for associative searching" by J.L. Bentley, Communications of the ACM, vol. 18, No. 9, 509–517 1975 and in "Geographical data structures compared: A study of data structures supporting region queries" by J. B. Rosenberg, IEEE Trans. on CAD, Vol. CAD-4, No. 1, 53–67, January 1985.

(1) 1-d tree

Figure 1:
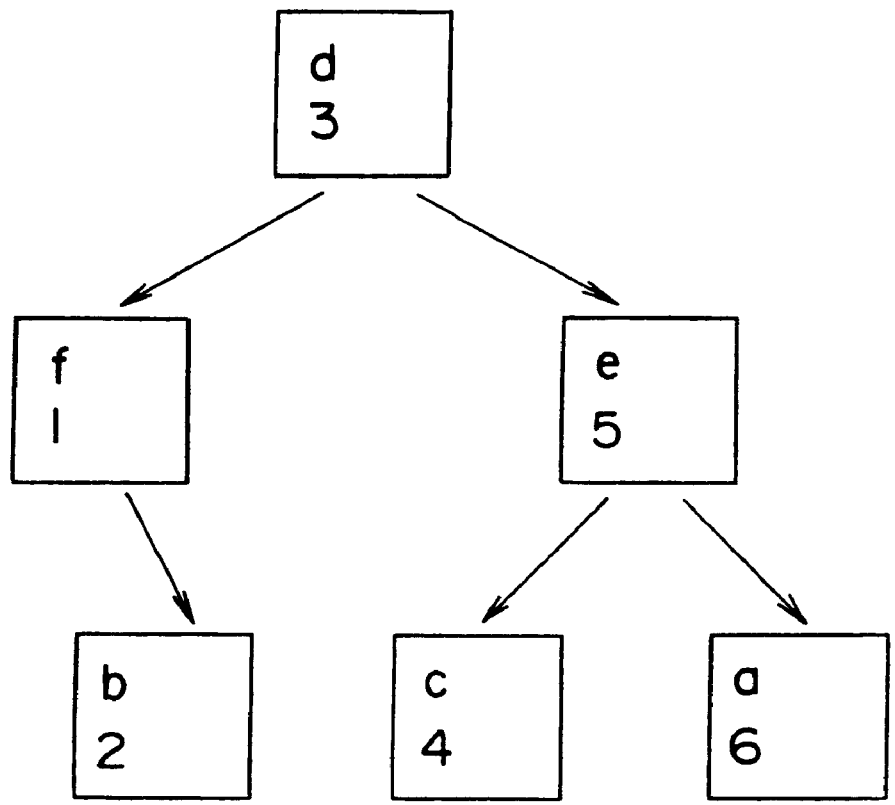
FIG. 1 is a diagram showing an example of a 1-d tree.

A 1-d tree is a simple binary tree. FIG. 1 shows an example of a 1-d tree. As shown in the figure, the tree has six nodes, a to f, each having its own key (numeric data). The root is node d, the children (represented as chd) of the root are nodes f and e, and leaves are nodes b, c, and a. The rule for generating a 1-d tree is as follows:

Rule 1. For any node x, $K(x) \geq K$ (ptree; root=left_chd (x))

Rule 2. For any node x, $K(x) < K$ (ptree; root=right_chd (x))

where, K is a key, and K(i) is the key of node i. "ptree; root=left_chd (x)" and "ptree; root=right_chd (x)" are any nodes included in the subtree "ptree" whose root is the left child node of x or the right child node of x respectively.

In this 1-d tree, a region search is possible. For example, if we are given the following condition, Condition: K<3 then, nodes f and b satisfy the condition. To find these two nodes, a check is first made to see if the root, node d, satisfies the above condition. Because the key of node d, 3, exceeds the upper bound of the condition, there is no need to check the nodes in the subtree whose root is the right child of the node d. Thus, once a search condition and key relations are given, a desired node can be found quickly.

(2) 2-d tree

A 2-d tree allows desired nodes to be found quickly when conditions are given to two keys. These two keys, independent of each other, must be included in one tree.

Figure 2:
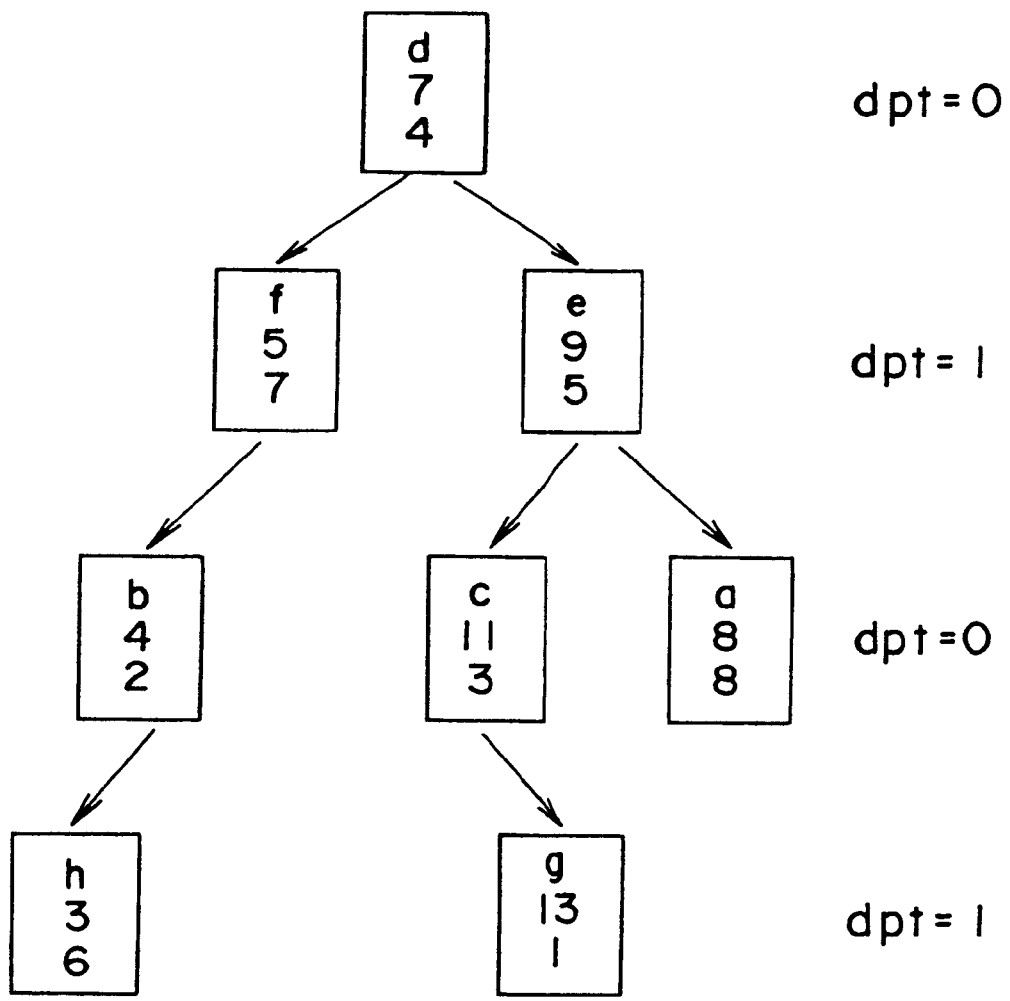
FIG. 2 is a diagram showing an example of a 2-d tree.

FIG. 2 shows an example of a 2-d tree in which there are eight nodes, a to h, each having two keys. For convenience, the top key is called "the 0th key", and the bottom key "the 1st key". The depth of node d (represented as D) at the root level is defined as 0, the depth of nodes d and e at the second level is defined as 1, and so on, with the depth of level n being (n−1). An indicator "dpt" is defined as follows:

dpt=D mod k

Because k, the number of keys, is 2, dpt is a repetition of 0 and 1. Rules for generating this tree is as follows:

Rule 1 For the dpt-th key K(x, dpt) in any node x, $K(x, dpt) \geq K$ (ptree; root=left_chd (x), dpt)

Rule 2 For the dpt-th key K(x, dpt) at node x, $K(x, dpt) < K$ (ptree; root=right_chd (x), dpt)

These rules are explained with reference to FIG. 2. For node d at the root, dpt=0. Hence, rules 1 and 2 are rewritten as follows.

Rule 1. The 0th key of node d is equal to or greater than the 0th key of any node in the subtree whose root is node f which is the left child of node d. In the figure, this is true because "7" (node d) is greater than "5" (node f), "4" (node b), and "3" (node h)

Rule 2. The 0th key of node d is less than 0th key of any node in the subtree whose root is node e which is the right child of node d. In the figure, this is true because "7" is less than "9", "11", "8", and "13".

Hence, node d and the subordinates nodes are related by the 0th key.

Next, consider node e. Because dpt=1 for node e, rules 1 and 2 are rewritten as follows:

Rule 1. The 1st key of node e is equal to or greater than the 1st key of any node in the subtree whose root is node c which is the left child of node e. In the figure, this is true because "5" is greater than "3" and "1".

Rule 2. The 1st key of node e is less than the 1st key of any node in the subtree whose root is node a which is the right child of node e. In the figure, this is true because "5" is less than "8".

Hence, node e and the subordinates nodes are related by the 1st key. Thus, a node with dpt=0 and the subordinate nodes of the node are related by the 0th key, and a node with dpt=1 and the subordinate nodes of the node by are related by the 1st key. A 2-d tree, which has two keys, may be treated like the binary tree described in (1) once a node is selected.

Figure 3:
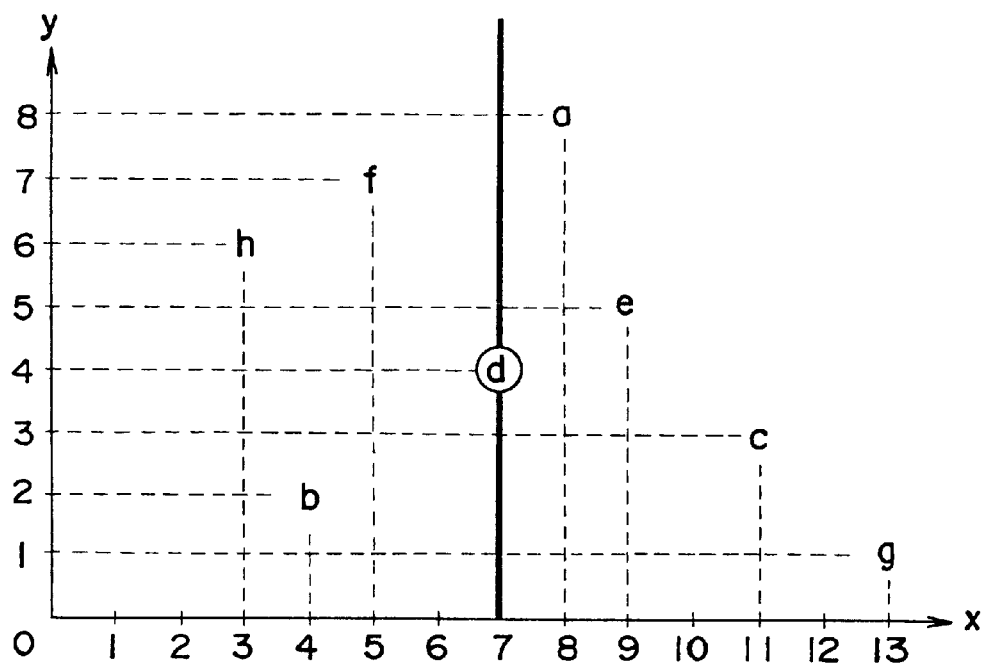
FIG. 3 is a diagram showing a relation between the 2-d tree and a two-dimensional area.
Figure 4:
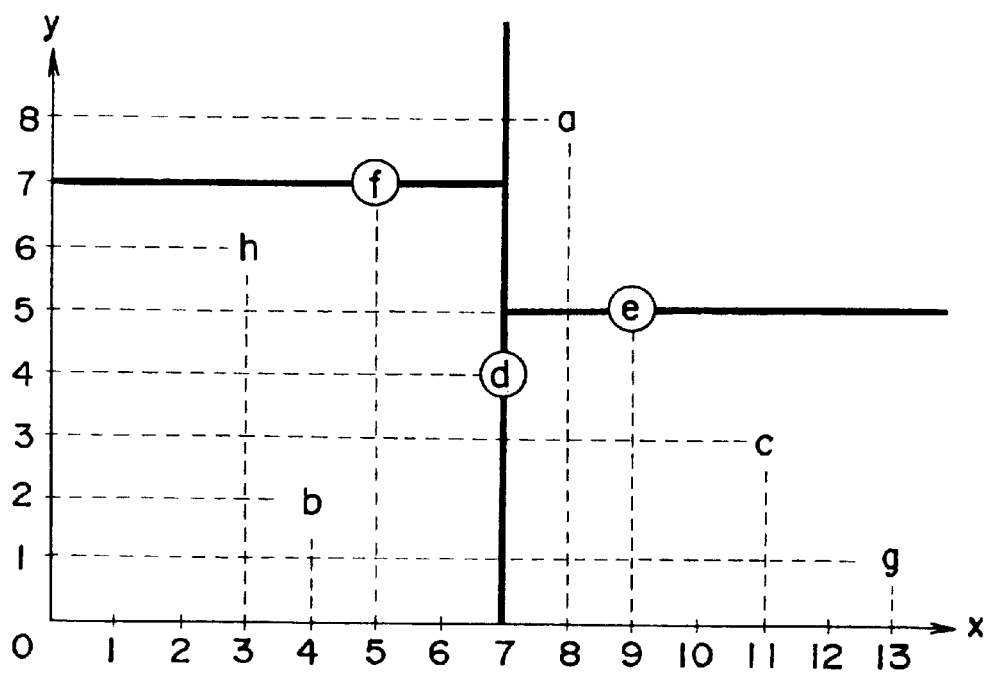
FIG. 4 is a diagram showing a relation between the 2-d tree and the two-dimensional area.
Figure 5:
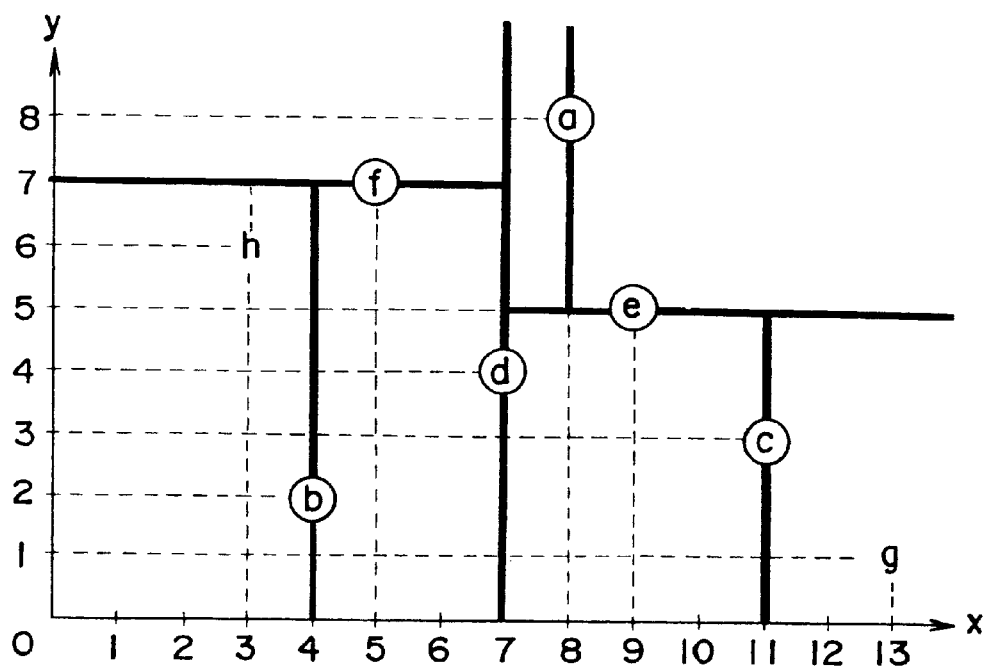
FIG. 5 is a diagram showing a relation between the 2-d tree and the two-dimensional area.

FIGS. 3 to 5 show the relationship between the 2-d tree and the two-dimensional region. In these figures, the x-axis is in the direction of the 0th key and the y-axis is in the direction of the 1st key. First, as shown in FIG. 3, the region is divided into two by node d (X=7). A node below node d belongs to one of two regions.

Next, as shown in FIG. 4, each region is divided into two by nodes f (y=7) and node e (y=5). In FIG. 5, each region is further divided by nodes b (x=4), c (x=11), and a (x=8). Therefore, it is apparent that a new node with any key belongs to one of two-dimensional regions shown in FIG. 3 and other figures, meaning that the node may be connected to the 2-d tree as a leaf. That is, a node finds its place in the tree no matter which node is selected as the root.

A 2-d tree generated as described above makes enables us to make a two-key region search. For example, suppose that the following two search conditions are given:

Condition 0: 0th key >7

Condition 1: 1st key >6 Under these conditions, only node a is selected.

In the selection process, first, a check is made to see if node d, the root, satisfies condition 0. Because the 0th key of node d(=7) does not satisfy the lower bound, it is determined that node f (the left child of node d) and the subordinate nodes do not satisfy the condition.

On the other hand, a check is made to see if node e, which satisfies condition 0, satisfies condition 1. Because the 1st key of node e(=5) does not satisfy the lower bound of condition 1, it is determined that node c (the left child of node e) and the subordinate nodes do not satisfy the condition. A repetition of this check efficiently narrows down candidate nodes.

(3) 6-d tree

A 2-d tree allows us to make a two-key search, meaning that we can search for a point in a desired region in the x-y plane. Similarly, the use of four keys, described as $X_{mij}$, $X_{max}$, $Y_{min}$, $Y_{max}$, allows us to define the nodes as a rectangular region in the x-y plane.

A 6-d tree has six keys. In this embodiment, 0th key to 5th key of the i-th object are $xi_{min}$, $yi_{min}$, $zi_{min}$, $xi_{max}$, $yi_{max}$, $zi_{max}$. $xi_{min}$ is the minimum x-coordinate of the space occupied by the i-th object, and $xi_{max}$ is the maximum x-coordinate. The same notation is used for the y-coordinates and z-coordinates. These six coordinates correspond to the vertexes of a bounding box which will be described later. The tree generation rules, not shown, are the same as those for a 2-d tree, except that k is 6 in the following depth calculation formula:

$$dpt = D \bmod k$$

[2] System configuration

Figure 6:
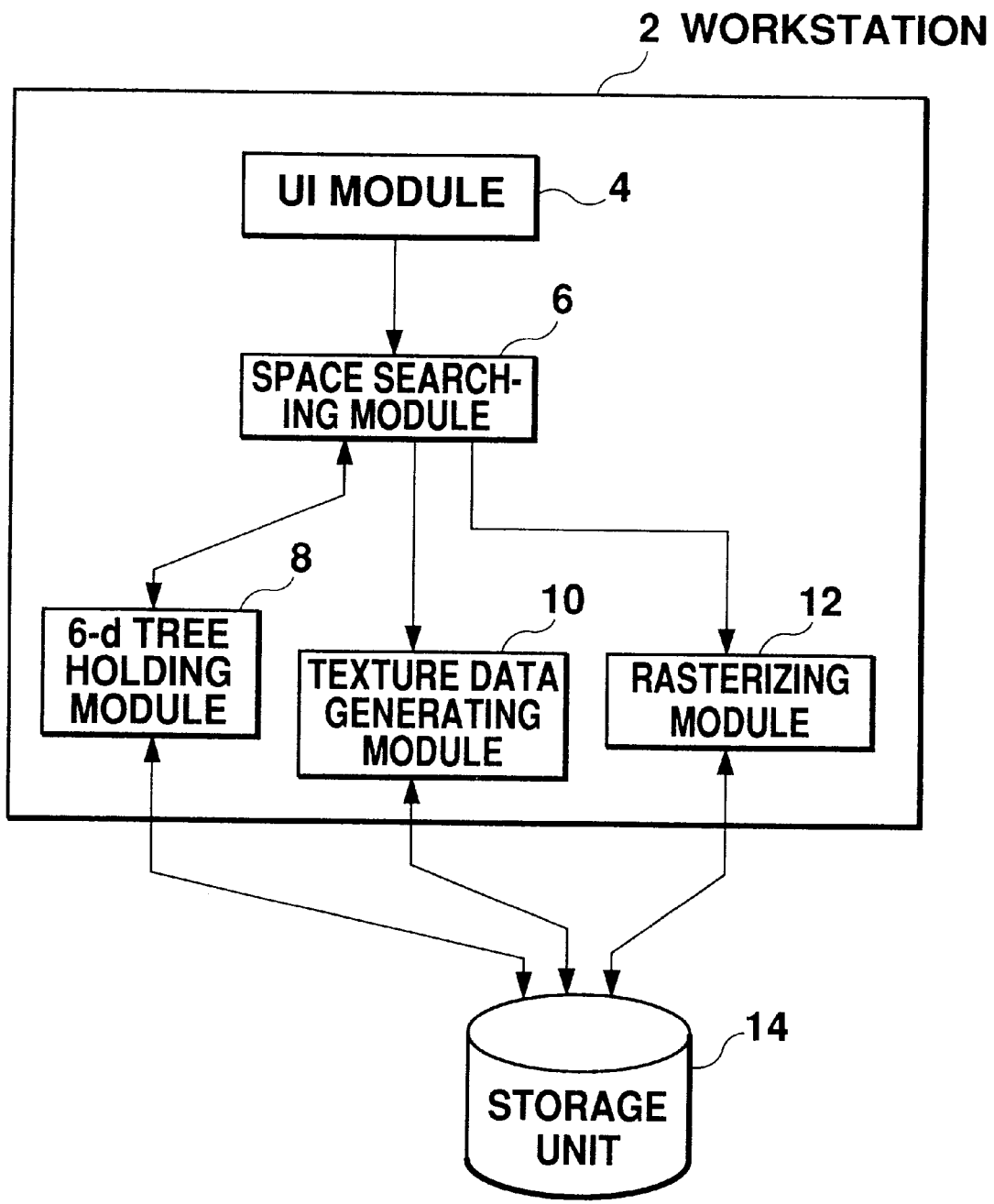
FIG. 6 is a diagram showing the configuration of a space search system using the three-dimensional object data processing method of this embodiment.

FIG. 6 is a diagram showing the configuration of a space search system which uses the three-dimensional object data processing method of this embodiment.

As shown in the figure, the system comprises a workstation 2 and a storage unit 14, such as a large hard disk or an MO disk unit. The storage unit 14 contains the 6-d tree representing the objects, data on the objects (hereafter group data). The workstation 2 comprises a user interface module (hereafter called UI) which accepts instructions from a user, a space searching module 6 which searches for an object or a group included in the view volume, a 6-d tree holding module 8 which holds on memory a 6-d tree read from the storage unit 14, a texture data generating module 10 which integrates a plurality of objects according to a user's grouping instruction to generate texture data, and a rasterizing module 12 which, upon receiving a view volume display request, searches for the objects and groups included in the view volume through clipping and transforms the their coordinates for display.

Figure 7:
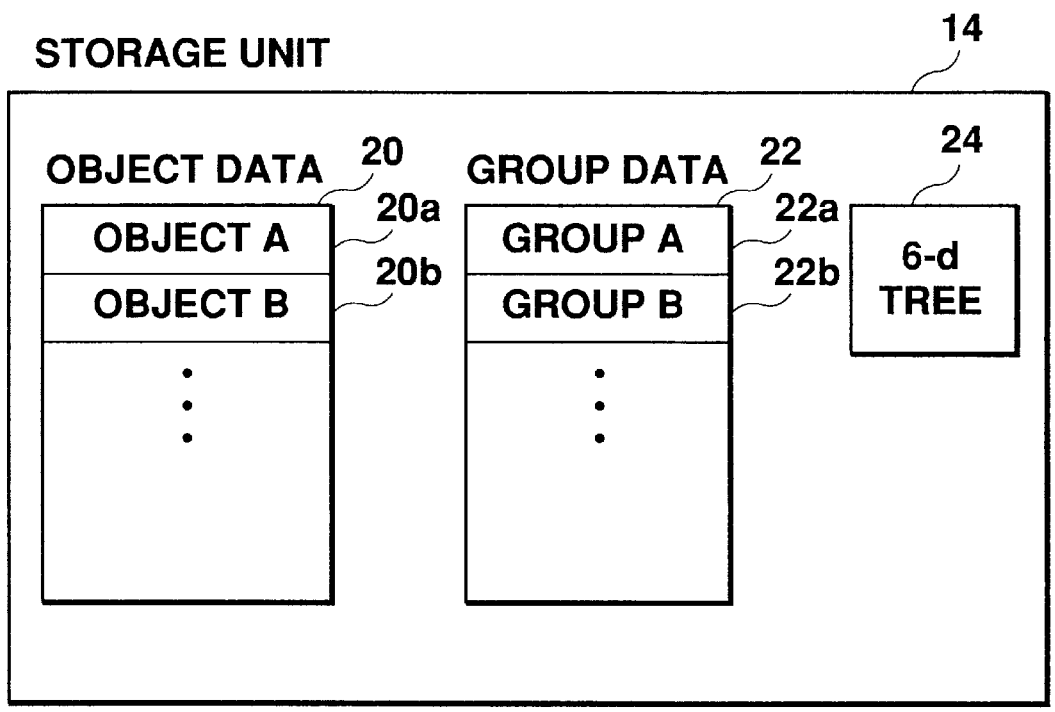
FIG. 7 is a diagram showing the internal configuration of a storage module.

FIG. 7 is a diagram showing the internal configuration of the storage unit 14. As shown in the figure, the major components of the storage unit 14 are an object data storage area 20 containing object data, a group data storage area 22 containing group data, and a 6-d tree storage area 24 containing a 6-d tree. The object data storage area 20 is subdivided into an object A area 20a, an object B area 20b, etc., while the group data storage area 22 into group A area 22a, group B area 22b, etc. The 6-d tree, which is read from the 6-d tree storage area 24, is usually loaded into the 6-d tree holding module 8 shown in FIG. 6.

Figure 8:
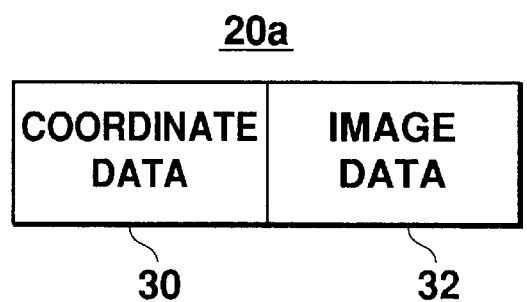
FIG. 8 is a diagram showing the internal configuration of the area of object A of FIG. 7.
Figure 9:
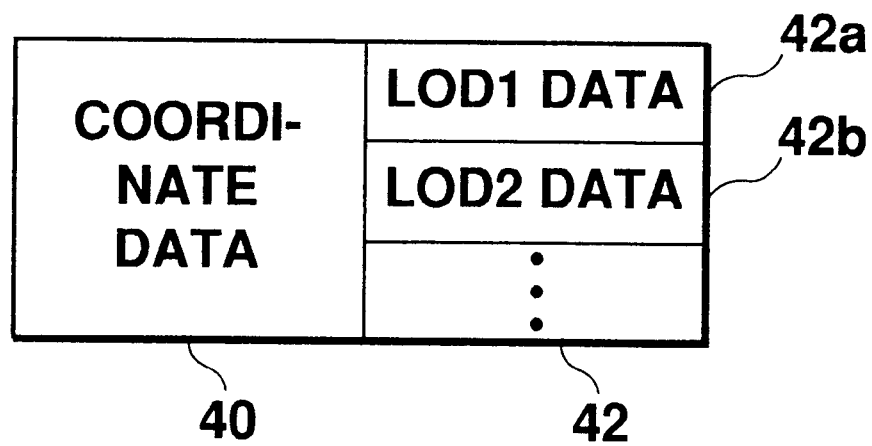
FIG. 9 is a diagram showing the internal configuration of the area of group A of FIG. 7.

FIG. 8 is shows the detailed internal structure of the object A area 20a shown in FIG. 7. As shown in the figure, the object A area 20a is composed of a coordinate data area 30 of object A and an image data area 32 containing data on the image of object A. When an object is represented by polygons, the coordinate data area 30 contains the coordinates of the vertexes of each polygon and the image data area 32 contains such data as polygon colors. FIG. 9 shows the internal structure of a group A area 22a. As shown in the figure, the group A area 22a is composed of a group A coordinate data area 30, a plurality of LOD data areas 42a, 42b, etc., prepared according to the level-of-detail of data on the image of group A. For example, when the distance between the eyepoint and group A is short, the LOD1 data prepared for a detailed model is used; when the distance is long, the LOD2 data prepared for a simpler model is used. LOD data is two-dimensional texture data.

[3] System operation

The operation of the system is divided roughly into two: an editing process and a display process. The editing process groups a plurality of objects to generate texture data and stores it in the storage unit 14. The display process searches for the objects and groups included in the view volume, rasterizes them, and displays them.

(1) Editing process

Figure 10:
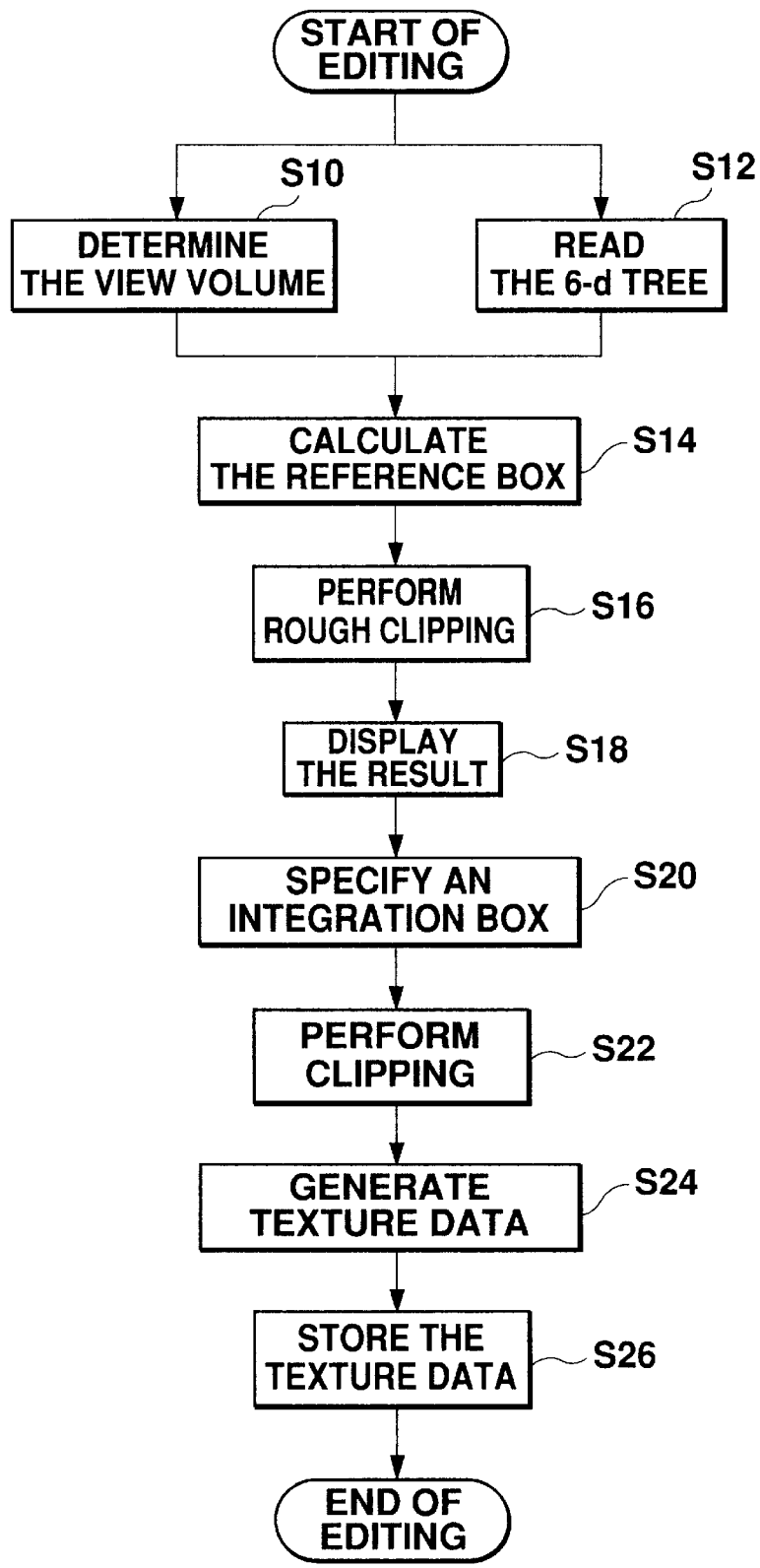
FIG. 10 is a flowchart showing a procedure for the editing process of the space search system.

FIG. 10 is a flowchart showing the editing process performed by the space search system. The editing process is divided into the following major steps. First, the eyepoint is determined by the user's instructions and the view volume is set up according to the eyepoint (S10). The system searches for the objects included in this view volume and displays them (S14–S18). The user specifies a box (called an "integration box") into which the objects the user wants to group is to be included (S20). Then, the system searches for the objects to be included in the integration box by performing clipping (S22) and projects the objects on the far side of the integration box from the eyepoint (called a projection side) in order to generate texture data (S24). The system associates the texture data with the group and stores it in the storage unit 14 (S26). The following details these steps.

First, the user enters an editing start instruction from the workstation 2 via the UI module 4. Next, the user enters view volume specification parameters to display the space view to be edited. The parameters include an eyepoint position, line-of-sight vector, and so forth. The space searching module 6 checks these parameters to determine the view volume (S10). In parallel with this processing, the 6-d tree is read from the storage unit 14 into the 6-d tree holding module 8 (S12). Then, the space searching module 6 calculates the reference box of the view volume (S14).

Figure 11:
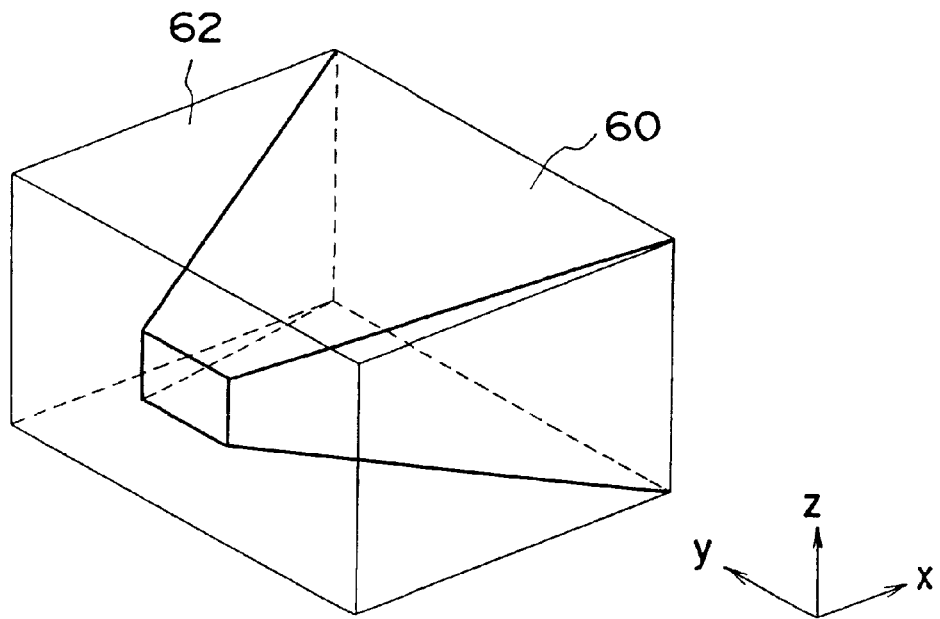
FIG. 11 is a diagram showing a reference box.

FIG. 11 is a diagram showing the reference box 62. The view volume is circumscribed by the "reference box" whose height, width, and depth, are parallel to the x, y, and z axis, respectively. Therefore, the reference box may be represented by six numeric values ($xs_{max}$, $xs_{min}$, $ys_{max}$, $ys_{min}$, $zs_{max}$, $zs_{min}$) corresponding to the maximum and minimum values of x, y, z coordinates of the 8 vertexes of the reference box.

Figure 12:
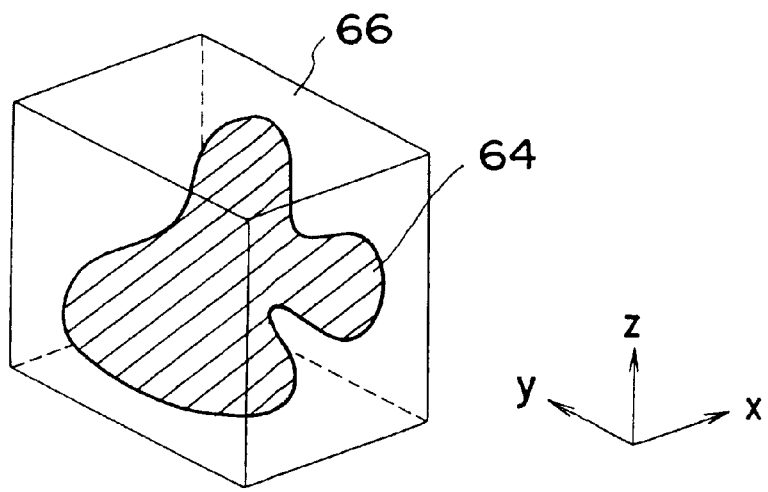
FIG. 12 is a diagram showing a bounding box.

FIG. 12 is a diagram showing a bounding box 66. An object 64 is circumscribed by a corresponding bounding box which has a height, a width, and a depth, each being parallel to the x, y, and z axis, respectively. The bounding box corresponding to the object i may be described by six numeric values: $xi_{max}$, $xi_{min}$, $yi_{max}$, $yi_{min}$, $zi_{max}$, and $zi_{min}$. The object 64, which is usually much smaller than the view volume 60, is magnified in the figure.

Then, the space searching module 6 extracts the bounding boxes included in the reference box ("rough clipping") (S16). For the space searching module 6 to do this processing, this embodiment uses a 6-d tree composed of a plurality of nodes, each corresponding to an object and each having a set of six numeric values such as $xi_{max}$ as the key. When clipping is performed, the module searches this 6-d tree with the six numeric values of the reference box as the search condition. For example, the search conditions for a bounding box to be completely included in the reference box are the following six:

Condition 0: the 0th key $xi_{min} \geq xs_{min}$
Condition 1: the 1st key $yi_{min} \geq ys_{min}$
Condition 2: the 2nd key $zi_{min} \geq zs_{min}$
Condition 3: the 3rd key $xi_{max} \leq xs_{max}$
Condition 4: the 4th key $yi_{max} \leq ys_{max}$
Condition 5: the 5th key $zi_{max} \leq zs_{max}$.

A search for a bounding box whose y-axis and z-axis coordinate values are completely included in the range of the y-axis coordinate and z-axis coordinate of the reference box but whose x-axis coordinate values are not included in the range of the x-axis coordinate of the reference box may be made by changing only condition 0 to Condition 0: the 0th key $xi_{min} < xs_{min}$ or by changing only condition 3 to Condition 3: the 3rd key $xi_{max} > xs_{max}$.

Considering a bounding box partly sticking out of the reference box in the y-axis or z-axis direction, a search for a bounding box partly sticking out of the reference box in one direction (x, y, or z) may be made by not referencing one of conditions 0 to 5. Similarly, a search for bounding boxes partly sticking out of the reference box in two directions (x and y, y and z, or z and x) may be made as follows:
(Condition 0 or 3 not referenced)×(Condition 1 or 4 not referenced)+(Condition 0 or 3 not referenced)×(Condition 2 or 5 not referenced)+(Condition 1 or 4 not referenced)×(Condition 2 or 5 not referenced)

Where operator "×" refers to logical AND, while operator "+" refers to logical OR. A search for bounding boxes partly sticking out of the reference box in three directions may be made by (Condition 0 or 3 not referenced)×(Condition 1 or 4 not referenced)×(Condition 2 or 5 not referenced).

In summary, the combinations of conditions to be used in a search for bounding box which is at least partly contained in the reference box are:

(Condition 0 or 3)×(Condition 1 or 4)×(Condition 2 or 5)

This logical expression can be expanded in 8 combination of conditions. For each of these eight combinations, bounding boxes that may be included in the reference box are selected. With above described search process, "rough clipping" is achived.

Next, the rasterizing module 12 performs processing. Data on the objects selected by rough clipping (S16) is loaded on main memory from the storage unit 14. The module transforms the coordinates, performs clipping (detailed clipping), rasterizes the objects in the view volume which are found during detailed clipping, and displays the rasterized results (S18).

Figure 13:
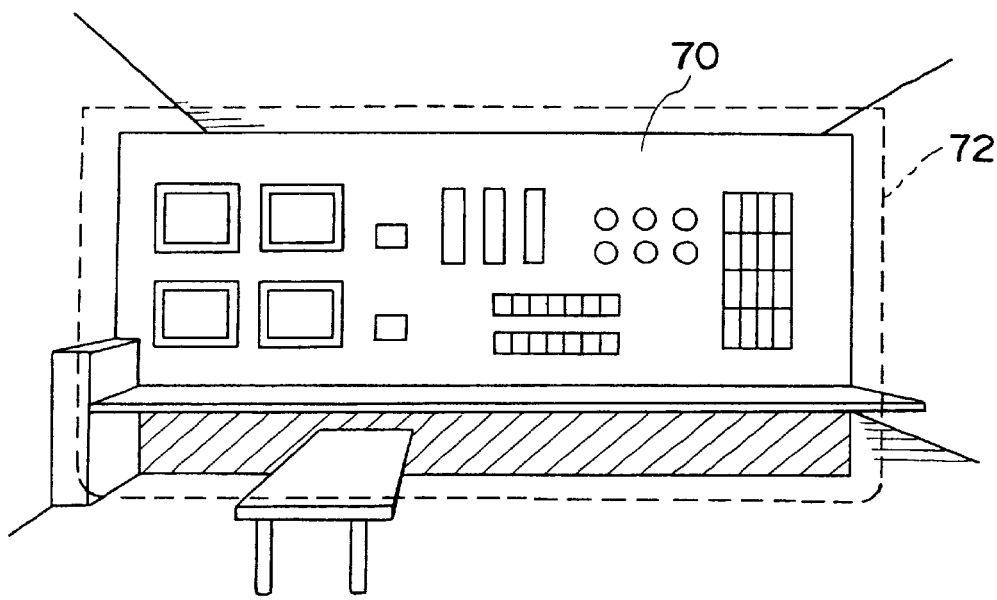
FIG. 13 is a diagram showing an example of a view volume displayed in step S18 of the editing process.

FIG. 13 shows an example of the view volume displayed in S18. In this example, a control panel 70 installed in a room is drawn. On the control panel 70 are provided many objects including displays, switches, and buttons. These objects, independent of each other, are processed independently during conventional CG processing. For example, clipping and coordinate transformation are done independently. This embodiment treats the whole control panel 70 as a group.

To do so, the user draws, perhaps using a mouse, a rough integration box 72 which includes the complete control panel 70 shown in FIG. 13 (S20). The integration box 72 includes only the plane vertical to the line of sight. Because the integration box may represent the height and the width but not the depth, a known method is used for the depth (for example, defaults are used). The integration box drawn by the user is sent to the space searching module 6 via the UI module 4, and the height, width, and depth are modified so that they are parallel to the x, y, and z axis respectively. The integration box, modified in this manner for use in clipping, is called a "modified integration box."

Figure 14:
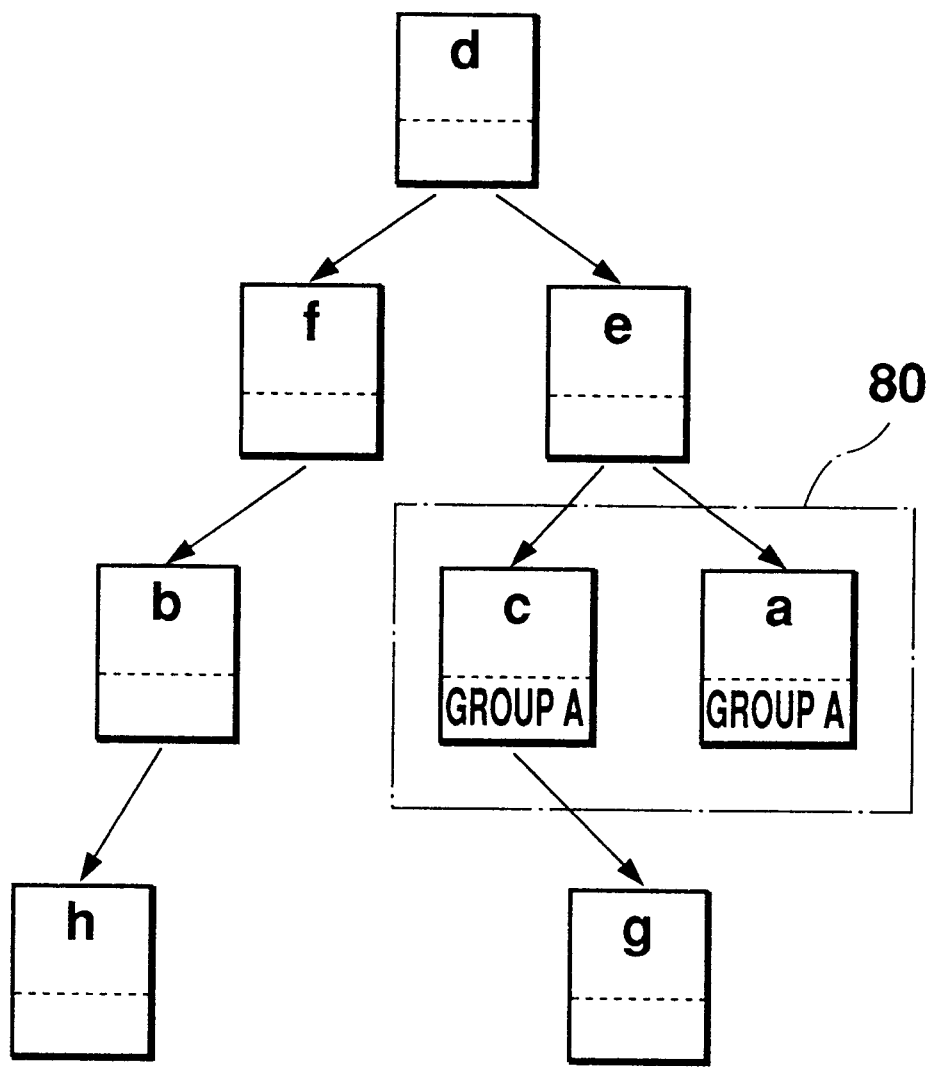
FIG. 14 is a diagram showing the concept of a 6-d tree containing nodes a–h.

Next, clipping is performed (S22) in the same manner as in S16 to determine which bounding boxes are included in the modified integration box. As a result of this clipping, the objects included in the modified integration box are identified for grouping. FIG. 14 shows the concept of a 6-d tree composed of nodes a to h. In FIG. 14, node a and node c are grouped into a group A 80. Each node in the 6-d tree has an area reserved for recording a group name. In this figure, the group name, "group A", is recorded in node a and node c. When a group name is written, the 6-d tree in the 6-d tree holding module 8 is updated. Once group A is set up, the coordinate data representing the spatial position of the group is written in the coordinate data area 22a in FIG. 9. For convenience, assume that the coordinate data represents the coordinates of the vertexes of the integration box for group A. Many objects on the control panel 70 in FIG. 13 are grouped into group A.

Figure 15:
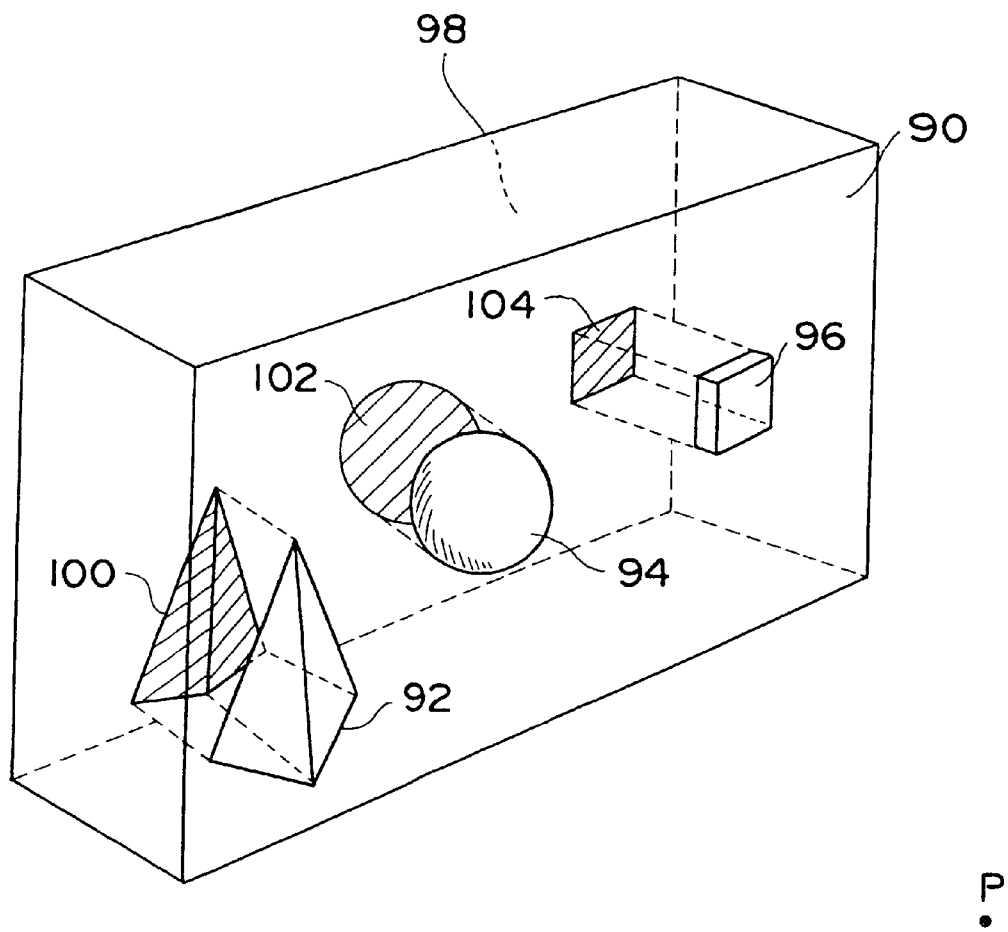
FIG. 15 is a diagram showing how texture data is generated in step S24 in FIG. 10.

Then, a texture data generating module 10 projects all the objects of group A onto the projection side of the integration box to generate texture data (S24). FIG. 15 shows how objects are projected. For simplicity, the modified integration box 90 is assumed to include only a trigonal pyramid object 92, a ball object 94, and a box object 96. The point P is a point of view (eyepoint). In this embodiment, the back side (far side from the view point) of the modified integration box 90 is the projection side 98 on which the three objects are projected by the parallel projection technique. Objects are projected on the back side in order to prevent other objects appearing in the modified integration box from being hidden by the texture data plane. In this figure, the images of the objects projected by this processing are indicated by shading.

When the texture data on group A is produced, the texture data generating module 10 stores the image in the LOD1 data area 42a shown in FIG. 9 (S26). At the same time, the module generates a low LOD image by subsampling the texture data and stores the image in the LOD2 data area 42b and, as necessary, generates and stores lower-LOD images in other LOD data areas (not shown) (S26). Finally, the module writes the remaining 6-d tree, contained in the 6-d tree holding module 8, back into the storage unit 14 if so requested by the user, and then ends editing.

(2) Display process

The display process, which is independent of the editing process, need not always follow the editing process. The display process may be started immediately after the system is started, in which case the previously-prepared groups may be used. Objects not belonging to any group are processed individually.

Figure 16:
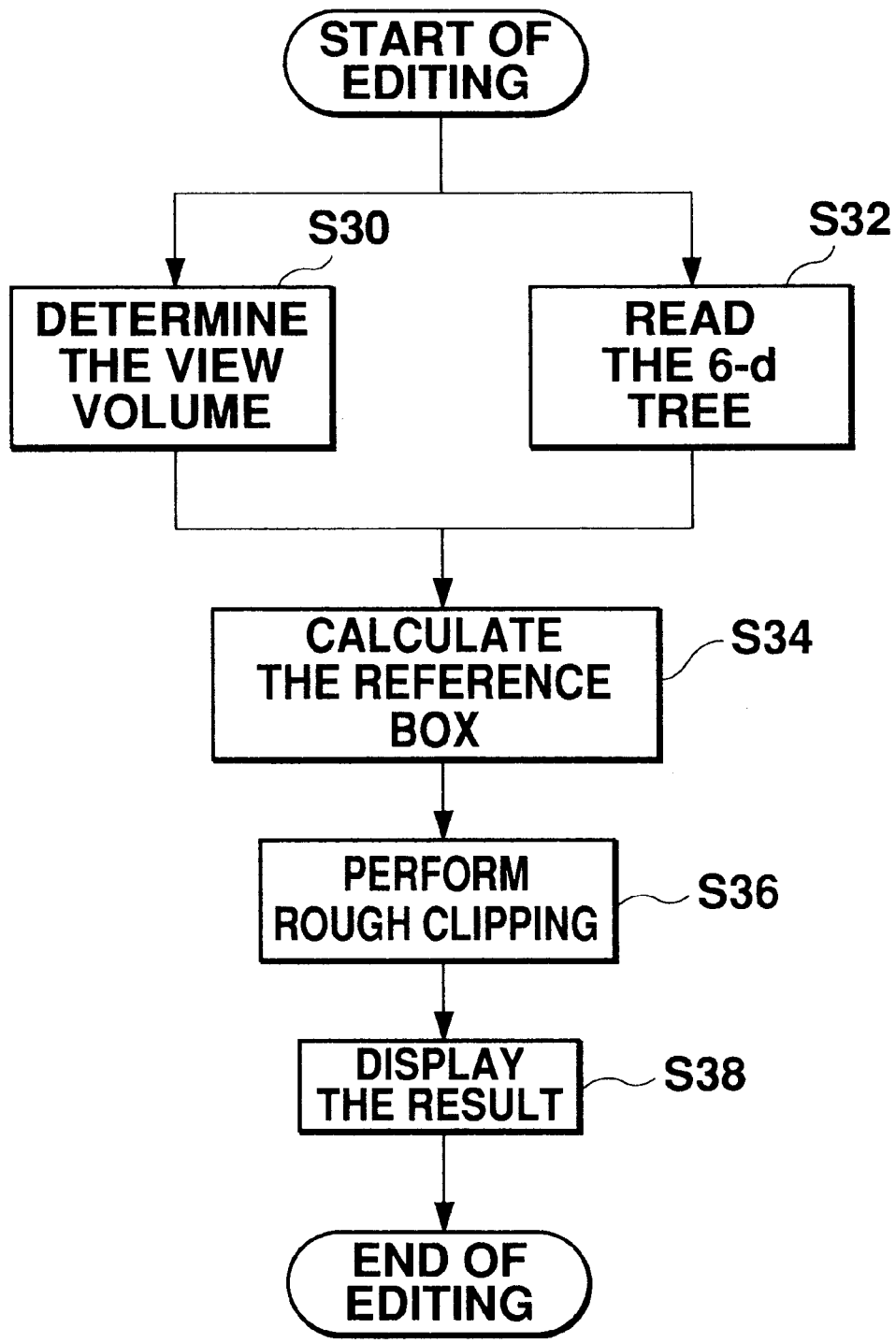
FIG. 16 is a flowchart showing the display procedure used in the space search system.

FIG. 16 is a flowchart showing the steps for the display process. Basically, the major steps for the display process are the same as those of the first half of the editing process (that is, the first step to S18 (display) in FIG. 10), except that groups must be considered.

First, a space to be displayed, i.e., a view volume, is determined via the UI module 4, as in the editing process (S30). In parallel with this processing, the 6-d tree of the object data is read into memory (S32) and the reference box is then calculated (S34).

Next, as in step S16, the space searching module 6 performs rough clipping (S36). That is, it searches the 6-d tree, from top to bottom, for an object (node) included in the reference box. At this time, the module checks if the node contains a group name. If the node does not contain a group name, the module reads only the coordinate data 30 and the image data 32 of the object from the storage unit 14. If the node contains a group name such as "group A", the module reads not only the coordinate and image data but also accesses the group data storage area 22 to read coordinate data 40 on group A shown in FIG. 9.

Thus, the objects and group A potentially included in the view volume are extracted during the rough clipping processing (S36) described above. After rough clipping, the rasterizing module 12 transforms the coordinates of the extracted objects and group A and performs clipping (detailed clipping), a known technique, on them. Based on the result, the module rasterizes (renders) only the objects and group A extracted in S36 and included in the view volume, and displays the rasterized results on the screen (S38). The module then varies the LOD of the texture data at which group A is to be rendered according to the distance between group A and the eyepoint O. That is, the module selects the texture data as follows. When group A is within a predetermined distance from the eyepoint O, the module uses LOD1 data 42a shown in FIG. 9 which is the most detailed. When group A is not within the predetermined distance from the eyepoint O, the module uses the rougher LOD2 data 42b shown in FIG. 9.

The display process is performed as described above. The system of this embodiment performs clipping on a plurality of objects of a group at a time, reducing the time needed to display images. In addition, the system of this embodiment, which processes group image data composed of two-dimensional texture data, performs coordinate transformation and rasterization on the group quickly, thus reducing the time needed to display images.

In this preferred embodiment, viewing transformation is performed on the texture data of a group. Thus, the walk-through view of the control panel 70 which is viewed when the eyepoint moves horizontally in front of the control panel may be generated easily. For example, when the eyepoint is moved right, the height of the left side of the control panel 70 looks relatively lower. This may be represented through viewing transformation.

The space search system using the three-dimensional object data processing method according to the present invention has the configuration described above and performs operations as describe above. This embodiment also has the following applications and variations.

(1) A plurality of objects on a control panel, which are physically-integrated objects, are grouped. However, the objects of a group need not be integrated. Objects having a spatial relation with each other may be grouped even if there is no logical or physical relation. For example, objects each approximately equal in distance from the eyepoint and placed relatively closely may be grouped even if there is no logical or physical relation among them.

(2) A box such as a reference box is used for clipping, is not always required. Any known clipping method may be used.

While there has been described what is at present considered to be the preferred embodiment of the invention, it will be understood that various modifications may be made thereto, and it is intended that the appended claims cover all such modifications as fall with in the true spirit and scope of the invention.

What is claimed is:

1. A three-dimensional object data processing method comprising:

a step of storing at least one piece of three-dimensional object data into a first storage unit;

a first extraction step of extracting objects included in a space relevant to rendering from the first storage unit; and a step of grouping the extracted objects into a group, associating the objects with the group and projecting the grouped object data onto an eyepoint dependent plane to generate two-dimensional texture data representing the group, and storing the texture data in a second storage unit associating the texture data with the group.

2. A three-dimensional object data processing method according to claim 1 wherein the first storage unit and the second storage unit are in the same large-capacity storage unit.

3. A three-dimensional object data processing method according to claim 1, further comprising:

a step of determining a view volume;

a second extraction step of extracting objects included in the view volume from the first storage unit;

a step of checking whether each object extracted in the second extraction step is associated with the group or not;

a rendering step of rendering an object extracted in the second extraction step, based on data on the object, when the object is not associated with the group; and a drawing step of reading the texture data on a group when the object extracted in the second extraction step is associated with the group and drawing the texture data.

4. A three-dimensional object data processing method according to claim 3, further comprising a step of displaying an image obtained by the rendering step and the drawing step.

5. A three-dimensional object data processing method according to claim 3 wherein the drawing step performs viewing transformation on the texture data.

6. A three-dimensional object data processing method according to claim 1, further comprising a step of generating low level-of-detail texture data by subsampling the texture data associated with the group and associating the low level-of-detail texture data with the group and storing the low level-of-detail texture data into the second storage unit.

7. A three-dimensional object data processing method according to claim 6, further comprising:
a step of determining a view volume;
a second extraction step of extracting objects included in the view volume from the first storage unit;
a step of checking whether each object extracted in the second extraction step is associated with a group or not;
a rendering step of rendering an object extracted in the second extraction step, based on data on the object, when the object is not associated with the group; and
a drawing step of finding a distance from the group to an eyepoint when the object extracted in the second extraction step is associated with the group, either reading the texture data on the group from the second storage unit when the distance is equal to or shorter than a predetermined distance or reading the low level-of-detail texture data on the group from the second storage unit when the distance is longer than the predetermined distance, and drawing the texture data or the low level-of-detail texture data.

8. A three-dimensional object data processing method according to claim 1 wherein the space relevant to rendering is a box-like space having a near side and a far side which are vertical to the line of sight.

9. A three-dimensional object data processing method according to claim 8 wherein the eyepoint dependent plane is the far side of the space relevant to rendering.

10. A three-dimensional object data processing method according to claim 9 wherein the texture data on the group is associated with the far side and is stored in the second storage unit.

11. A three-dimensional object data processing method according to claim 1, further comprising a step of displaying objects with the texture data on the group on the far side of the space relevant to rendering.

12. A three-dimensional object data processing method according to claim 1, further comprising:
a step of generating a plurality of texture data pieces each having a different level-of-detail for the group and storing the plurality of texture data pieces into the second storage unit; and
a step of drawing the group using one of texture data pieces stored in the second storage unit, said one of texture data pieces having its own level-of-detail corresponding to the distance from the group to the eyepoint.

13. A three-dimensional object data processing method according to claim 1 wherein the first extraction step extracts one or more objects from the space relevant to rendering using a tree having a plurality of nodes each corresponding to an object and having the coordinates of the corresponding object as a key.

14. A three-dimensional object data processing method according to claim 13, further comprising a step of associating identification data of the group with the nodes corresponding to the objects associated with the group.

15. A three-dimensional object data processing method comprising:
a grouping step of grouping a plurality of objects according to a spatial relation; and
a step of generating texture data for each group generated in the grouping step, the texture data being generated from the image data of the objects included in the group.

16. A three-dimensional object data processing method according to claim 15, further comprising:
a step of determining a view volume;
an extraction step of extracting objects included in the view volume from the first storage unit;
a step of checking whether each object extracted in the second extraction step is associated with the group or not;
a rendering step of rendering an object extracted in the extraction step, based on data on the object, when the object is not associated with the group; and
a drawing step of drawing the texture data on the group when the object extracted in the extraction step is associated with the group.

17. A three-dimensional object data processing method according to claim 15, further comprising a step of displaying an image obtained by the rendering step and the drawing step.

18. A three-dimensional object data processing system comprising:
first storage means for storing at least one piece of three-dimensional object data;
means for determining a space relevant to rendering;
first extraction means for extracting objects included in the space relevant to rendering from the first storage means; and
texture data generating means for grouping into a group the objects extracted by the first extraction means, for associating the objects with the group, and for projecting the grouped object data onto an eyepoint dependent plane to generate two-dimensional texture data representing the group; and
second storage means for storing the texture data generated by the texture data generating means associating the texture data with the group.

19. A three-dimensional object data processing system according to claim 18, further comprising:
means for determining a view volume;
second extraction means for extracting objects included in the view volume from the first storage means;
means for checking whether each object extracted by the second extraction means is associated with the group or not;
rendering means for rendering the object extracted in the second extraction means, based on data on the object, when the object is not associated with the group; and
texture data drawing means for reading the texture data on the group when the object extracted in the second extraction means is associated with the group and for drawing the texture data.

20. A three-dimensional object data processing system according to claim 19 wherein the texture data drawing means perform viewing transformation on the texture data.

* * * * *